Feb. 17, 1953　　　G. A. WALDIE ET AL　　　2,628,595
FLUID METER
Filed July 8, 1950　　　　　　　　　　　4 Sheets-Sheet 1

*INVENTOR.*
Robert M. Conklin
George A. Waldie
BY
*Adams, Stevens, + Mase*
AGENTS.

Feb. 17, 1953 G. A. WALDIE ET AL 2,628,595
FLUID METER
Filed July 8, 1950 4 Sheets-Sheet 2

INVENTOR.
Robert M. Conklin
George A. Waldie
BY
Adams, Stevens, & Mase
AGENTS.

Feb. 17, 1953  G. A. WALDIE ET AL  2,628,595
FLUID METER
Filed July 8, 1950  4 Sheets-Sheet 3

INVENTOR.
Robert M. Conklin
George A. Waldie
BY
Adams, Stevens, + Mase
AGENTS.

Feb. 17, 1953 G. A. WALDIE ET AL 2,628,595
FLUID METER
Filed July 8, 1950 4 Sheets-Sheet 4

INVENTOR.
Robert M. Conklin
BY George A. Waldie

Adams, Stevens, & Mase
AGENTS.

Patented Feb. 17, 1953

2,628,595

UNITED STATES PATENT OFFICE 2,628,595

FLUID METER

George A. Waldie, Worthington, and Robert M. Conklin, Columbus, Ohio, assignors, by mesne assignments, to The Wayne Pump Company, Salisbury, Md., a corporation of Maryland Application July 8, 1950, Serial No. 172,738

6 Claims. (Cl. 121—121)

1

This invention relates to fluid metering devices, and particularly to an improved type of positive displacement piston-type liquid meter.

Dispensing apparatus for the retail selling of gasoline, as now in common use, is of the "meter pump" type. This refers to a combination of parts including a motor-driven pump for withdrawing gasoline from a low-level tank, and discharging it ultimately through a hose provided at its end with a manually controlled nozzle, which is inserted in the tank opening of the customer's automobile. The liquid, after emerging from the pump, flows through an air separator, and thence to a meter. The meter is geared to a register whose mechanism reflects the volume so dispensed, and also, in many instances, the price.

Various types of meters have been used in the development of the "meter pump" type of dispenser. Early units incorporated liquid meters of the rotating disc or oscillating vane type, such as are commonly used for household water service. These, however, were soon found to have serious disadvantages.

The nature of the dispensing operation is such that variable flow rates and pressure differentials are inevitable. The slippage volume through the disc-type meters varies irregularly, making such meters almost impossible of accurate calibration for all conditions of operation. Another adverse factor is the high resistance imposed on the meter by the register mechanism. The combination of parts, which is considered conventional for meter pumps, requires that the primary element of the measuring equipment be not only a flow-responsive device, but also a hydraulic motor for the register. This type meter loses accuracy as the motor load upon it increases.

The trend, therefore, has been toward positive-displacement piston-type meters. While such meters require greater hydraulic pressure for their operation, due to their own internal friction, they are more accurate and can maintain their accuracy while functioning as hydraulic motors for the high-resistance type of registers. It is believed that, for over the past ten years at least, substantially all gasoline meter pump units have employed meter elements of this type.

This particular type meter must be calibrated when it is installed, and from time to time during its life. There are various mechanisms which are incorporated in positive-displacement piston-type meters to so effect calibration. Perhaps the most common type of such calibrating device is the piston-stop mechanism. By limiting the length of stroke of the piston, usually by means of a mechanical stop at the head end of the cylinder, the meter may be calibrated. Such calibrating devices are at best not highly accurate, do not lend themselves to fine adjustment, and in practice have proven quite unsatisfactory.

The principal object of this invention, therefore, is to provide a liquid-volume meter in which the length of stroke of the pistons in the measuring cylinders may be very readily and vary accurately varied.

A further object of this invention is to provide a liquid-volume meter which may be easily disassembled for repair, cleaning, or any other purpose.

With these objects in view, this invention resides in the novel elements and combination of elements described hereinafter and illustrated in the accompanying drawings in which.

Figure 1:
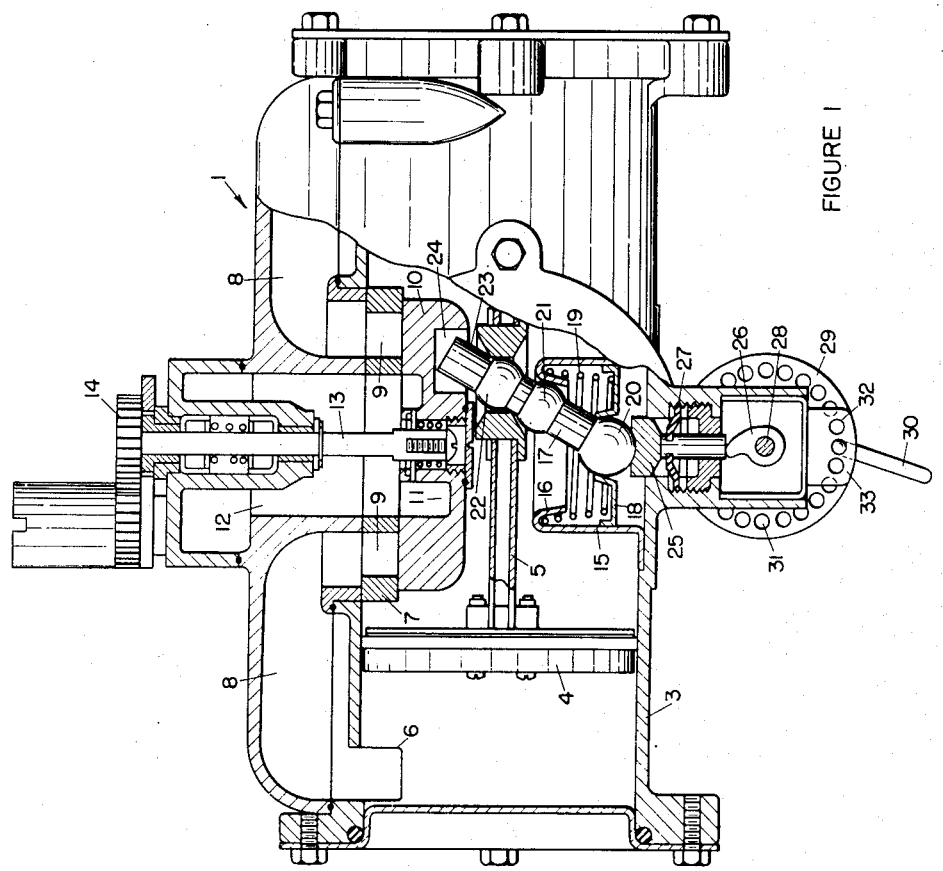
Figure 1 is a side elevation view of a meter, partly in section, embodying the invention.
Figure 2:
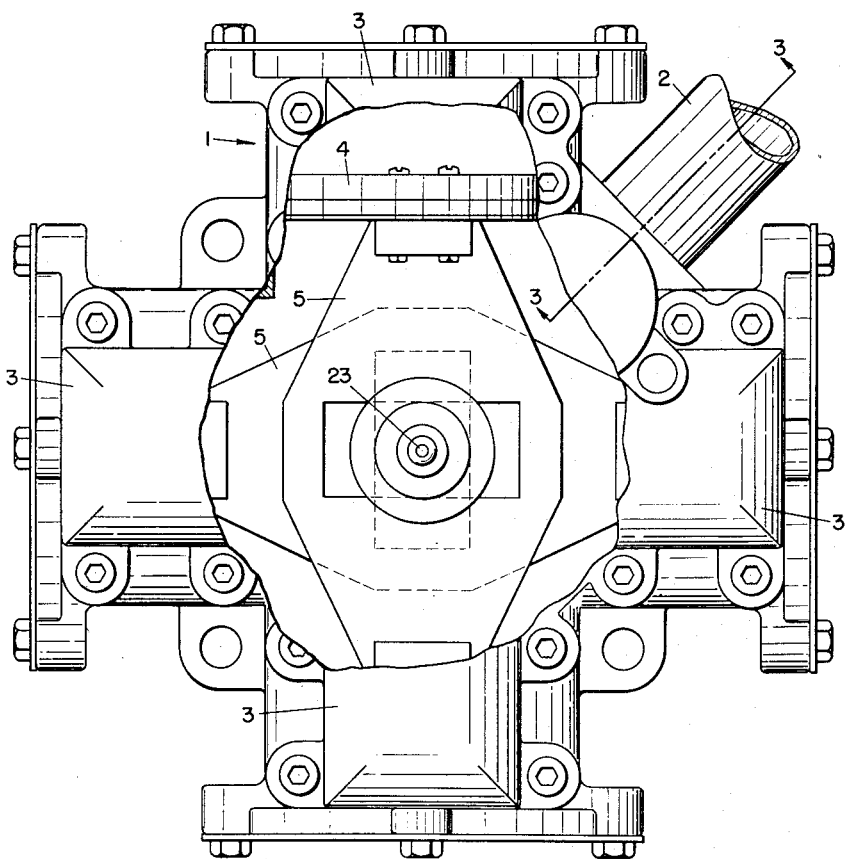
Figure 2 is a plan view of a meter embodying the invention with a portion of the top broken away.

Referring to the drawings, and more particularly to Figures 1, 2, 3, and 6:

The meter comprises a casing indicated generally at 1, cruciform in shape. Connected to the upper part of the casing is a discharge pipe 2 and at the lower part of the casing is the inlet pipe 34 (see Figure 3). Radially disposed, diametrically opposed metering cylinders 3 are provided in the casing 1 and slidably positioned in each of these cylinders is a piston 4, opposite pairs of pistons being rigidly connected together by means of a Scotch yoke 5. A port 6 is provided at the upper, outer end of each cylinder. Connecting each port 6 to a corresponding opening in the valve seat 7 is a passageway 8, which is in registration with opening 9 in the valve seat 7. Cooperating with the valve seat 7 is a valve 10, having an opening 35 extending therethrough (see Figure 6). When this opening 35 is in registration with opening 9 in the valve seat, it permits a flow of fluid from the interior of the casing into the passageway 8. Diametrically opposed to this opening in the valve 10 is a depression, partially shown at 11 in Figures 1 and 6. When the opening 35 extending through valve 10 is in registration with an opening 9, the depression 11 will be in registration with the diametrically opposed opening 9 and with a center passageway 12, which leads to the discharge pipe 2. The valve 10 rotates a shaft 13, which through suitable gearing 14, registers the volume of fluid passing through the meter, and in many instances, in the case of a commercial gasoline meter, the price. At the base of the interior of the casing is a stop cup 15, the upper edge of which is overturned as shown at 16, and in plan is in the form of a truncated pyramid. Inclinedly positioned in said cup is a cam follower rod 17, which is held to the base of the casing by means of the fitting 18 and the spring 19. The lower end of this rod is provided with a ball 20. Midway between the two ends of the cam follower rod 17 is a second spherical protrusion 21, and above that is a third, 22. The spherical surface 21 is adapted to travel around the edge 16 of the stop cup, while the spherical surface 22 is adapted to be moved by and cooperate with the Scotch yokes 5. The upper end 23 of the cam follower rod 17 slidably engages a radial slot 24 in the base of the valve 10.

The manner of operation of this meter is as follows: Liquid is forced, by means of a pump, through the inlet pipe and into the chamber 1. Such liquid will exert a pressure on the inner sides of all pistons and will flow through the opening 35 extending through the valve 10, through the opening 9 in the valve seat which is in registration therewith, into the passage 8, through the port 6, and down into the head end of the cylinder 3, and thereby exert a pressure on the outer head end of the piston 4. At the same instant, fluid will be permitted to flow at substantially the meter discharge pressure from the cylinder in which is positioned the oppositely disposed piston, up through the port 6 in the head end of said cylinder, the passageway 8, the opening 9 in the valve seat, through the depression 11 in the valve, through the passageway 12 and thence to the discharge pipe 2. Since all fluid on the head end side of the oppositely disposed piston will have a pressure substantially equal to the meter discharge pressure, and since the two pistons are rigidly connected together, there will be a movement of the pistons through one complete stroke, caused by substantially the difference between the meter inlet and discharge pressures. Such a movement will cause the Scotch yoke to move the cam follower rod 17, which will both rotate and revolve, controlled by the stop cup. Since the upper end 23 of the cam follower rod engages the valve 10, the valve will rotate a certain angular distance. This will bring the opening 35 extending through the valve 10 into registration with the next adjacent opening in the valve seat 7 and the pumping process will be repeated, thereby discharging another metered quantity of liquid out through the discharge pipe. The peculiar plan view shape of the stop cup 15, as shown in Figure 5, is caused by the necessity of having dwell periods as the valve ports open and close.

All meters which are used in gasoline delivery systems must be calibrated when installed, and occasionally during their life they need calibration to compensate for inaccuracies arising from wear, etc. The manner of calibration usually results in changing the stroke of one or all of the pistons. As disclosed herein a novel means has been devised for effecting a change in the length of stroke of all of the pistons, simultaneously. Furthermore, the change in stroke, while infinitesimal, is actuated by a very rough adjustment in the external calibrating device.

Figures 4, 5:
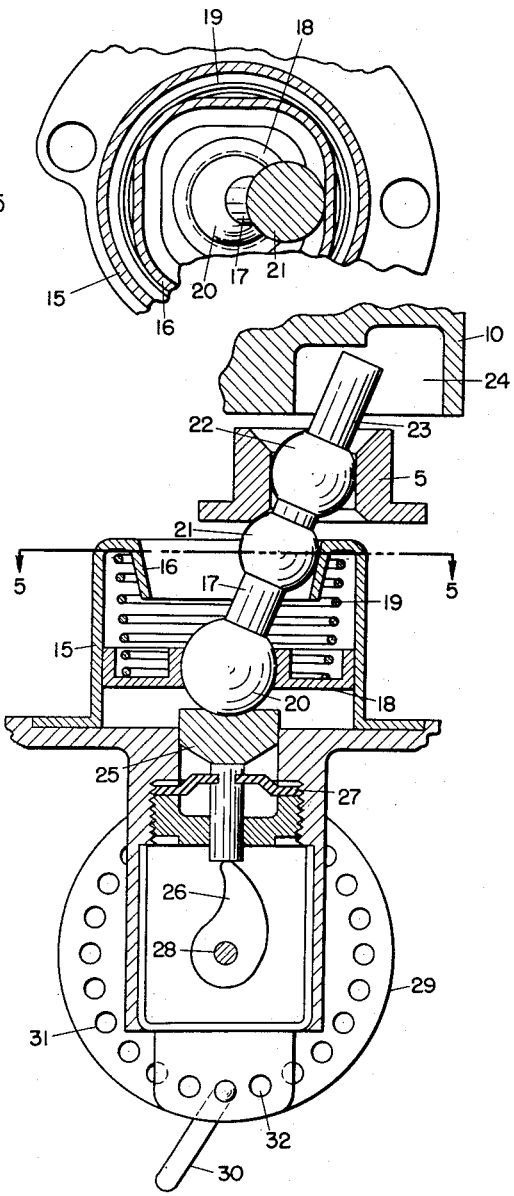
Figure 4 is a slightly enlarged, fragmentary side elevation view of the device, partly in section, showing the piston-stroke-calibrating means.
Figure 5 is a section of Figure 4 in the plane 5—5.

Referring to Figures 1, 4, and 5, the spherical base 20 of the cam follower rod 17 rests on a stop 25 which rests on a cam 26, passing through a seal 27. This cam 26 is rigidly positioned on a shaft 28, which rotates with, and is connected to, the calibrating wheel 29. A rod 30 is provided and is adapted to pass through the holes 31 in the movable wheel 29, and corresponding holes 32 in the fixed plate 33.

In order to calibrate the meter, the cam 26 merely is rotated, and locked in position by passing the rod 30 through the holes 31 and 32. Such a peripheral movement of the wheel 29 may be as much as half an inch or an inch in length, yet this will only cause a change in the stroke of the pistons in the nature of a few thousandths of an inch. As the cam is rotated, the stop 25 is moved in a vertical direction, thereby moving the center point of the spherical member 20 also in a vertical direction. Since the cam follower rod 17 may be considered to be resting on a fulcrum which is the inner overturned edge of the stop cup 15, movement in a vertical plane of the bottom or lower end of the rod will result in slight horizontal movement of the upper end of the rod, thereby effecting a variation in the length of stroke of all of the pistons simultaneously, and consequently effecting a calibration of the meter.

Figure 6:
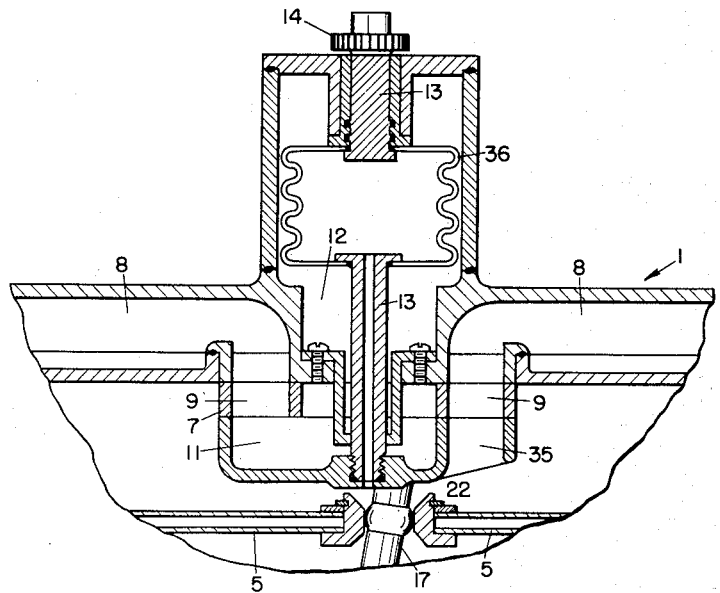
Figure 6 is a fragmentary side elevation view, partly in section, showing a modification of the device.
Figure 3:
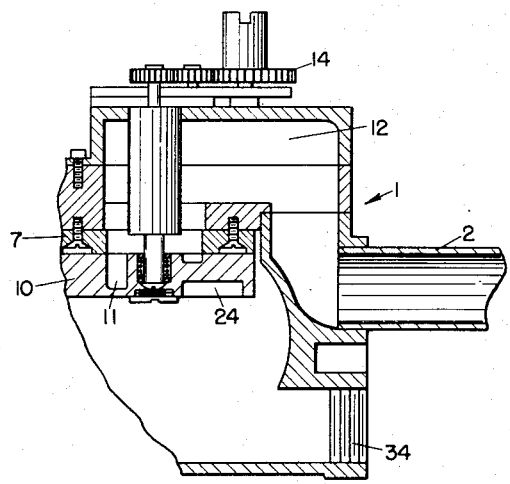
Figure 3 is a section of Figure 2 in the plane 3—3.

Referring now more particularly to Figure 6, which shows a modified valve arrangement, it will be obvious that the lower part of the shaft 13 is hollow and opens into the interior of the casing. The upper and lower parts of the shaft 13 are connected by means of a flexible bellows 36. The pressure on the inside of the casing forcing the valve up against the valve seat will be the same as the pressure inside the bellows, and since there is a substantial area on which this pressure can operate forcing the valve in the opposite direction, and away from the valve seat, it will be apparent that there will be less tendency for the valve and the valve seat to bind as the valve rotates in this modification of the meter.

From the foregoing, it should be apparent that there has been devised a novel means for varying the length of stroke of the pistons in a positive displacement piston type meter. This novel calibrating means has the advantage of enabling a mechanic to make a rough adjustment at the readily accessible external calibrating wheel, which results in an extremely fine movement of the piston. Furthermore, since the size of the spherical segments increase in diameter downwardly and due to the novel attachment of the calibrating mechanism to the casing, it is extremely easy to remove this entire portion of the mechanism for repair, cleaning, replacement, or any other purpose.

While this invention has been described in its preferred embodiment, it is to be understood that the words used are words of description rather than of limitation and that changes within the purview of the appended claims may be made

What is claimed is:

1. A fluid-volume measuring device comprising a casing having radially disposed cylinders in said casing, pistons slidably positioned therein, a cam, positioned centrally of said cylinders, a substantially cylindrical cam follower rod movable by said pistons, and adapted to follow the surface of said cam, a valve rotatable by the upper end of said rod, resilient means constrainedly positioning the lower end of said rod, and adjustable means for moving the lower end of said rod upwardly.

2. A fluid-volume measuring device comprising a casing having radially disposed cylinders in said casing, pistons slidably positioned therein, a cam, positioned centrally of said cylinders, and fixedly secured to the interior base of said casing, a substantially cylindrical cam follower rod movable by said pistons, and adapted to follow the surface of said cam, a valve rotatable by the upper end of said rod, resilient means normally urging the lower end of said rod toward the base of said casing, and adjustable means for moving the lower end of said rod upwardly.

3. A fluid-volume measuring device comprising a casing having radially disposed cylinders in said casing, pistons slidably positioned therein, a cam, positioned centrally of said cylinders, and fixedly secured to the interior base of said casing, a substantially cylindrical member having an enlarged lower end, said member being movable by said pistons, and adapted to follow the surface of said cam, a valve rotatable by the upper end of said substantially cylindrical member, resilient means normally urging said enlarged end of said substantially cylindrical member toward the base of said casing, and adjustable means for moving said enlarged end away from the base of said casing.

4. In a fluid-volume measuring device comprising a casing having cylinders in said casing, pistons slidably positioned therein, and a valve, a cam, positioned centrally of said cylinders, valve rotating means movable by said pistons and comprising a cam follower rod adapted to follow the surface of said cam, and adjustable means for varying the elevation of the lower end of said rod.

5. A fluid-volume measuring device comprising a cruciform casing having four radially disposed diametrically opposed cylinders in said casing, pistons slidably positioned therein, a Scotch yoke rigidly connecting opposite pistons, a cam, having a surface substantially in the form of an inverted truncated pyramid, fixedly secured to the lower portion of said casing and positioned centrally of said cylinders, a valve in the upper portion of said casing, an inclined cylindrical valve actuating member provided with three, spaced, semi-spherical protrusions thereon, a spring normally urging the lowest of said protrusions toward the base of said casing, said middle protrusion being adapted to follow said cam surface, said upper protrusion being adapted to be moved by said Scotch yokes, and means for moving said lower protrusion upwardly.

6. A fluid-volume measuring device comprising a casing having radially disposed cylinders in said casing, pistons slidably positioned therein, a piston rod for each piston, a substantially cup-shaped cam member, on the lower portion of said casing, positioned centrally of said cylinders, and provided with a cam surface substantially in the form of an inverted truncated pyramid, a substantially cylindrical member inclinedly positioned in said cam, member, three semi-spherical protrusions axially spaced on said cylindrical member, a spring positioned within and bearing against said cam member, said protrusions on said cylindrical member being so spaced that the upper protrusion is approximately co-planar with and is moved by said piston rods, the middle protrusion follows said cam surface, and the lower protrusion is normally urged downwardly by said spring, and means for moving said lower protrusion upwardly.

GEORGE A. WALDIE.
ROBERT M. CONKLIN.

REFERENCES CITED

The following references are of record in the file of this patent:

UNITED STATES PATENTS

| Number | Name | Date |
|---|---|---|
| 2,066,972 | Granberg | Jan. 5, 1937 |
| 2,233,246 | De Lancey | Feb. 25, 1941 |

FOREIGN PATENTS

| Number | Country | Date |
|---|---|---|
| 28,999 | Australia | Sept. 15, 1931 |